United States Patent
Vigneau et al.

Patent Number: 6,008,907
Date of Patent: *Dec. 28, 1999

[54] PRINTER CALIBRATION

[75] Inventors: Michael J. Vigneau, Stoneham; Jay E. Thornton, Watertown; Bror O. Hultgren, III, Ipswich, all of Mass.

[73] Assignee: Polaroid Corporation, Cambridge, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 08/950,580

[22] Filed: Oct. 15, 1997

[51] Int. Cl.$^6$ ........................ H04N 1/46
[52] U.S. Cl. .......... 358/1.9; 358/406; 358/448; 358/504; 358/518; 358/520; 358/523; 358/531; 358/537; 382/162; 382/167; 348/179
[58] Field of Search ............. 395/109; 358/406, 358/448, 504, 518, 520, 523, 531, 537; 382/162, 167; 348/179

[56] References Cited

U.S. PATENT DOCUMENTS

| | | | |
|---|---|---|---|
| 4,310,248 | 1/1982 | Meredith | 356/402 |
| 5,313,291 | 5/1994 | Appel et al. | 358/501 |
| 5,539,540 | 7/1996 | Spaulding et al. | 358/518 |
| 5,638,117 | 6/1997 | Engeldrum et al. | 348/179 |
| 5,721,623 | 2/1998 | Boxma | 358/448 |

FOREIGN PATENT DOCUMENTS

| | | |
|---|---|---|
| 0 624 028 A1 | 11/1994 | European Pat. Off. . |
| 0 685 962 A2 | 12/1995 | European Pat. Off. . |
| 0 794 657 A2 | 9/1997 | European Pat. Off. . |

OTHER PUBLICATIONS

International Color Consortium Profile Specification, Version 3.3, Nov. 1996.

*Primary Examiner*—Mark R. Powell
*Assistant Examiner*—Lance W. Sealey
*Attorney, Agent, or Firm*—Robert J. Decker; Robert A. Sabourin

[57] ABSTRACT

A system and method for calibrating a printer includes the steps or functions of: printing a predetermined color test pattern with the printer by transforming data, representing said predetermined color test pattern, from a device-independent color space to a device-dependent color space associated with the printer by use of a color transform, said predetermined color test pattern including a set of color patches with one of said color patches representing a preferred mid-gray hue; providing a predetermined reference gray surface; comparing said reference gray surface to said set of colored patches of the printed test pattern to find a closest matching one of said patches, if the closest matching one of said patches is the patch representing the preferred mid-gray hue, then ending the method; otherwise determining, for each color channel of the printer, a solution set of correction values as a function of believed gray versus actual gray, said solution set derived from and including a white point, a black point and a point mapped at $\{G_b, G_a\}$ where $G_b$ is the believed gray value of the closest matching one of said patches and $G_a$ is the actual gray value of the closest matching one of said patches; and adding to the color transform the corresponding solution set for each color channel of the printer.

12 Claims, 5 Drawing Sheets

PRINTER CALIBRATION

BACKGROUND OF THE INVENTION

This invention relates generally to a method and apparatus for calibration of printers. More particularly, the invention relates to a printer calibration method and apparatus whereby an unsophisticated user can calibrate a color printer by visually matching a reference gray card with a corresponding patch on a printed test pattern, without the use of a color measurement instrument such as a calorimeter or spectrophotometer.

A common problem when dealing with digital color imaging devices is getting the colors to match. For example, a color scanner is an input device in an image processing system that operates in some given device dependent color space such as red, green and blue (RGB) color space where colors are described in terms of RGB values or digits. The RGB values associated with specific colors are particular for the given device so that a digital imaging device which uses RGB digits (such as a monitor, digital camera or scanner) transforms a digital image into device-dependent RGB color space having RGB values which are dependent not only on the colors in the image, but on the particular device being used.

Digital output devices, e.g. printers, also operate in a given device-dependent color space which typically differs from those used by input devices. For example, many printers operate in cyan magenta, yellow and black (CMYK) device-dependent color space where output device color digits are CMYK values. Moreover, since the CMYK values are device-dependent, colors printed on any given printer will probably not match colors printed on a different printer for the same CMYK values. Further complicating color matching between devices is the fact that different devices have different color capabilities. Every rendering device, such as a printer or monitor, has a limited range of colors, i.e. gamut, that it can reproduce. Those skilled in the art will recognize that color display monitors tend to be able to produce a wider range of lighter colors whereas color printers tend to be able to produce a wider range of darker colors. Consequently, the gamut for a color display monitor is different from the gamut for a color printer. As a result, some colors displayed on monitors cannot be reproduced on color printers and vice versa. In other words, the combination of color device digits needed to acquire, process or render a particular color for one device is usually not the same as the combination of color device digits needed to acquire, process or render the same color on another device.

Figure 1:
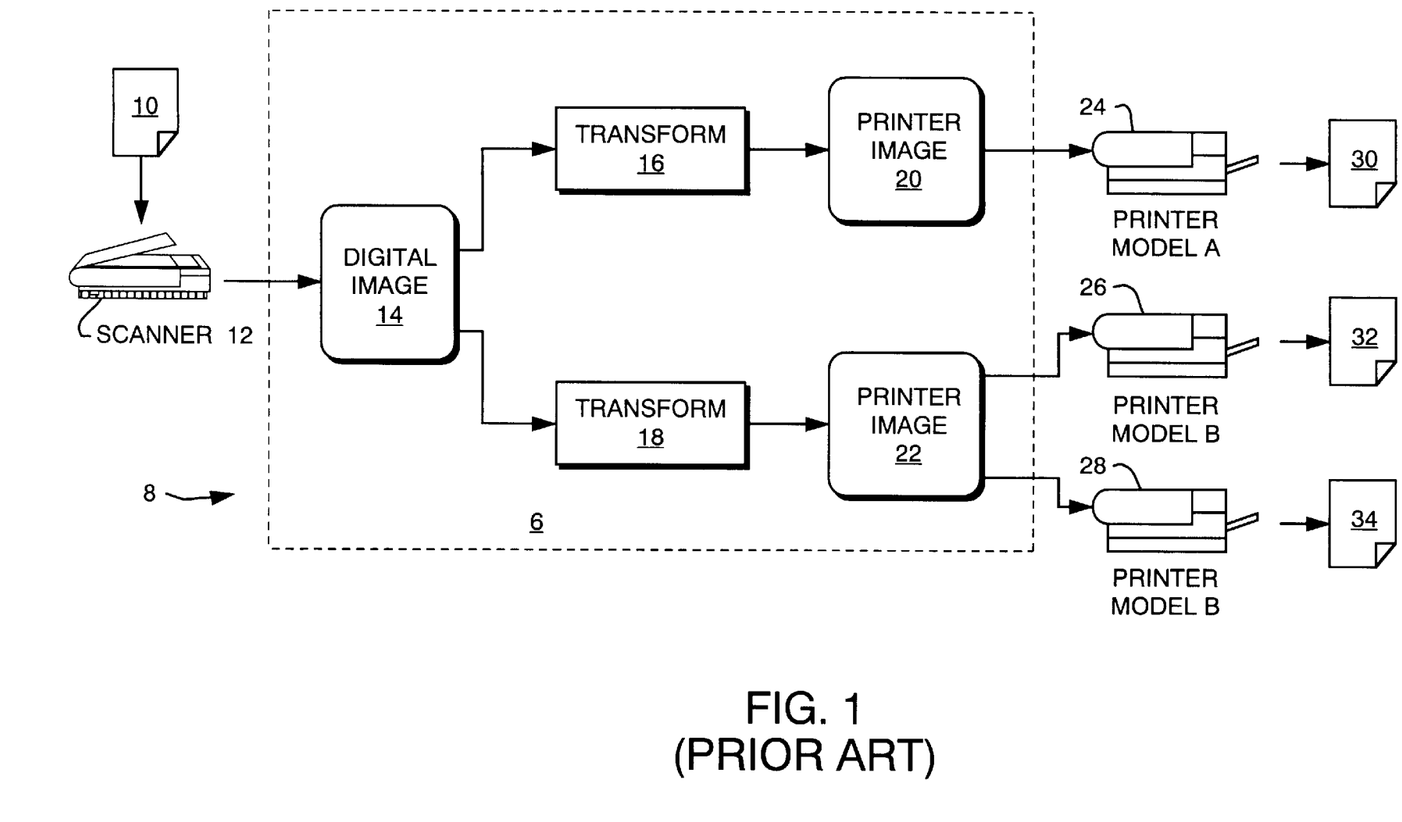
FIG. 1 is diagram of one preferred embodiment of an image processing system which can be used in conjunction with the present invention for printer calibration.

Many solutions exist for transforming color information from an input device to an output device in such a way that the perceived colors in the image are preserved. Often, the solution requires multiple transformations to account for more than one pair of input and output devices. FIG. 1 illustrates a block view of a typical imaging system 8 that incorporates such transforms.

A physical image 10 is acquired in digital form by an image acquisition, e.g. input, device such as a scanner 12. The scanner 12 translates the physical image 10 into a digital image 14 having device digits which are dependent upon the scanner 12 The digital image 14 is then sent for processing in the computer 6 where it is passed though two separate transforms. The color transform 16 converts the digital image 14 into a first printer image 20 appropriate for sending to a printer 24 of a particular model ("Model A"). The color transform 18 converts the digital image 14 into a second printer image 22 appropriate for sending to printers 26 or 28 of a different model ("Model B"). The first printer image 20 is then sent to the Model A printer 24, which produces a hardcopy 30. The second printer image 22 is sent to two distinct Model B printers 26 and 28 which produce hardcopies 32 and 34, respectively.

There are many ways in which the transforms 16 and 18 can be implemented. A common method is to use profiles for each input and output device. A device profile is standardized and defined as "a digital representation of the relation between device coordinates and a device-independent specification of color" in the International Color Consortium (ICC) Profile Format Specification, Version 3.3, Nov. 11, 1996, page 101 incorporated herein in its entirety for supplemental background information which is non-essential but helpful in appreciating the applications of the present invention.

The characterization of a device's image pixel data in device-independent color space is commonly codified in a tagged file structure, referred to as the device profile, that accompanies the digital imaging device.

A standard ICC profile includes header information, a tag table and tagged element data. The profile header provides the necessary information to allow a receiving system to properly search and sort ICC profiles. The header includes, but is not limited to, the following parameters: size; color management module (CMM) type; version number, device class; color space; connection space; creation date and time; file signature; primary platform target; flags; device manufacturer, device model; device attributes; rendering intent; XYZ values; and the name of the creator.

The profile size is given in bytes. The CMM, profile version number and device class each identified. The three basic device profile classes are input, output and display. Profiles are also classified as device link, color space conversion, abstract or named color profiles. Device link profiles provide a mechanism in which to save and store a series of device profiles and non-device profiles in a concatenated format as long as the series begins and ends with a device profile. Color space conversion profiles are used as a convenient method for CMMs to convert between different non-device color spaces. Abstract color profiles provide a generic method for users to make subjective color changes to images or graphic objects by transforming the color data within a profile connection space (PCS) to be described later. Named color profiles are related to device profiles so that, for a given device there would be one or more device profiles to handle process color conversions and one or more named color profiles to handle named colors. The color space of the data stored in the profile could be any color space such as XYZ, L*a*b*, Luv, RGB, CMY, CMYK, etc. Further, the profile connection space can be any device-independent color space such as XYZ or L*a*b*. The primary platform signature indicates the primary platform or operating system for which the profile was created. The profile flags indicate various hints for the CMM such as distributed processing and caching options. The device attributes are noted which are unique to the particular device setup such as the media type. The rendering intent is either perceptual, relative colorimetric, saturation or absolute colorimetric.

The tag table acts as a table of contents for the profile tags and the tag element data therein. Each profile classification requires a different set of tags. Of course, the intent of using tags with profiles is to provide a common base level of functionality. One example of a tag is the calibrationDateTimeTag which provides profile calibration date and time.

Initially, this tag matches the contents of the creationDateTime header flag. This allows applications and utilities to verify if this profile matches a vendor' profile and how recently calibration has been performed. Another example of a tag is the mediaWhitePointTag which specifies the media white point and is used for generating absolute colorimetry. It is referenced to the profile connection space so that the media white point as represented in the profile connection space is equivalent to this tag value. Many other profile tags are available as described in the ICC specification The ICC specification further defines a Profile Connection Space (PCS) as a device-independent color space which can be used as a standard intermediary color space for transforming color information from one device-dependent color space to another (e.g. RGB to CMYK). For example, the transformation of a color image from a digital camera to a printer can be described as a transformation into the PCS via the digital camera's profile followed by a transformation out of the PCS via the printer's profile. The PCS, however, is a virtual space so that the image may never actually be represented in the PCS on disk or in a computer memory. Thus, the PCS is regarded as a virtual stage of the image processing in contrast to an interchange or exchange color space, which is an encoding for the storage and transmission of images.

Although the use of profiles is common as standardized by the ICC, any known procedure for transforming color data between device-independent space and device-dependent space can be utilized with the present invention.

Figure 2:
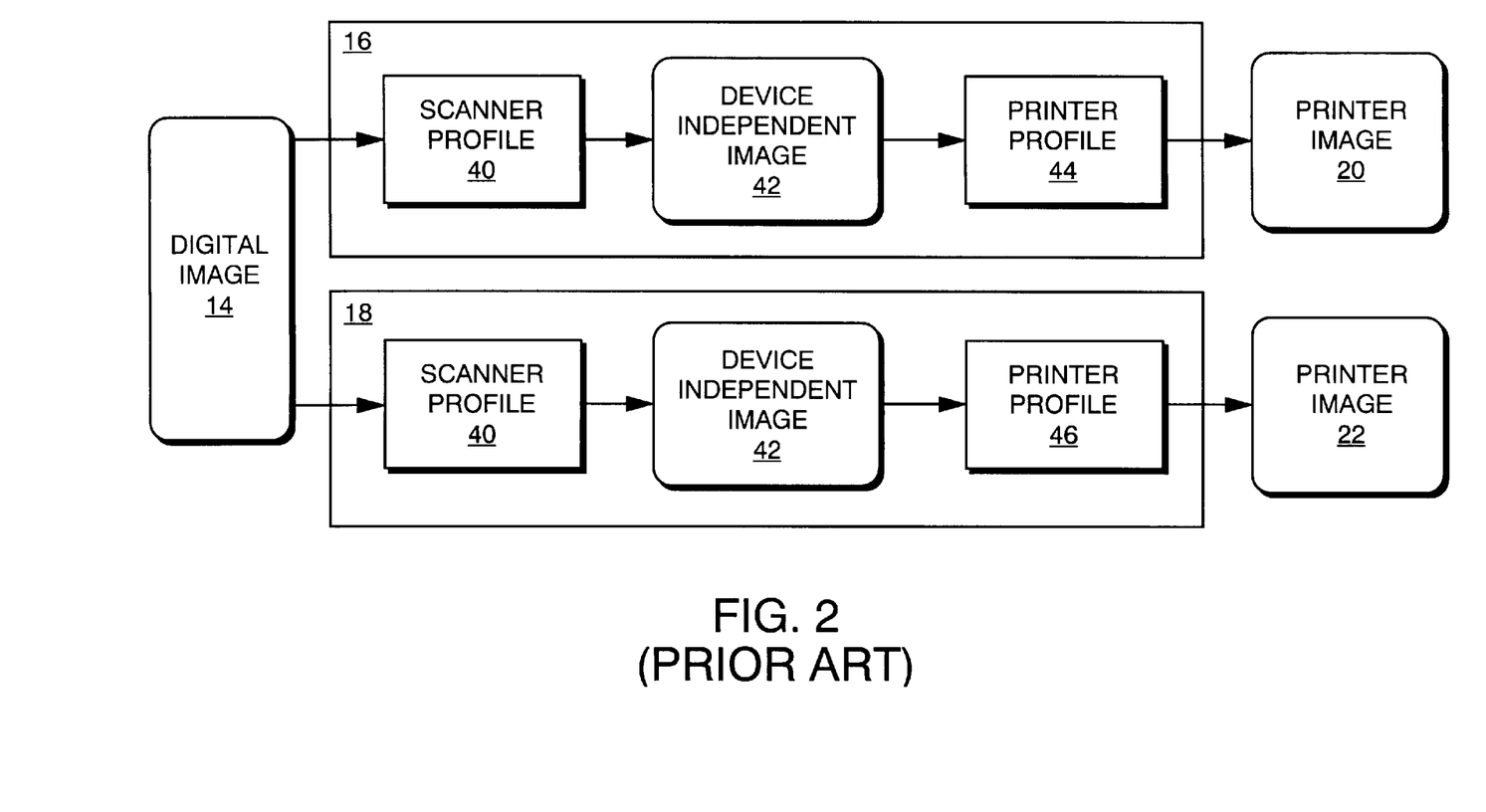
FIG. 2 is a diagram illustrating the use of device profiles as a way of implementing the transforms shown in FIG. 1.

FIG. 2 illustrates the use of profiles to implement the transforms of FIG. 1. The digital image 14 is transformed into a device-independent image 42 in device-independent color space in accordance with information supplied by the scanner profile 40. Thereafter the device-independent image 42 is transformed into the device-dependent color space of the printers 24, 26 and 28 (see FIG. 1) in accordance with information supplied by the printer profiles 44 and 46, respectively. If the profiles 44 and 46 each contain the proper information for transforming the color image data from the device-independent image 42, the resulting hardcopies or physical images 30, 32 and 34 generated by the printers 24, 26 and 28, respectively, should look identical. In practice, this is rarely the case due to variations within the printers. These variations are caused by numerous factors such as: tolerances in original parts used to manufacture the printers; variations in amount and type of usage; changes in the device's consumables (e.g. new paper, new ink, new ribbons); changes in the environment (e.g. temperature and humidity); maintenance; replacement of parts; and aging of the device over time. Moreover, a transform is designed to be used not only for a particular printer or model of printer, but for a particular set of viewing conditions for the resultant physical image. One aspect of these viewing conditions is the spectral power distribution of light in which the physical image is viewed. Small variations in the actual lighting used can lead to variations in the observed image. In fact, gross variations in lighting usually negate the desired effect of the transform, resulting in poor color reproduction of the physical image when produced by the printer.

In order to compensate for the above shortcomings in consistent hardcopy reproduction of an image, calibration is used to discover and correct for variations in individual printer behavior.

There are many methods of printer calibration currently in existence. Typically, calibration is performed by printing out a set of color patches, measuring those patches with a color-measuring instrument such as a spectrophotometer or colorimeter, comparing those measurements with a set of expected measurements, and correcting for the difference between the two sets. A spectrophotometer measures the spectrum of energy reflected across the range of visible wavelengths, whereas a colorimeter measures the specific device-independent values of a color patch.

Disadvantages to conventional calibration methods include the requirement of expensive measurement equipment (such as the spectrophotometer or calorimeter), intricate knowledge of the equipment's operation and interpretation of the resulting measurements. Since calibration is often performed in the field by the end user of the system, rather than by the system designers, this puts a burden on the end user. Furthermore, measuring instruments are subject to error. For instance, most instruments contain their own light source to illuminate the object being measured. Many of these instruments assume that the same type of light will be used to view the measured object, but this is rarely the case in real-world situations. Even devices such as spectrophotometers, which try to eliminate the effect of their built-in illuminant, are subject to error because the spectral power distribution of the built-in light may vary from the spectral power distribution of the actual illuminant used, and any fluorescence effects will cause calculated measurements to be incorrect. A further disadvantage of conventional calibration methods is that there is no accounting for any small difference between the actual lighting and the assumed lighting.

It is thus a primary object of the present invention to overcome the above and other disadvantages of conventional printer calibration by providing an easy to use printer calibration method and system.

It is another object of the present invention to provide a printer calibration method and system which does not require the use of external measuring devices such as a spectrophotometer or colorimeter.

It is yet another object of the present invention to provide a printer calibration method and system which accounts for possible small variations between the actual lighting and the lighting which is expected by the transform.

It is further an object of the present invention to provide a printer calibration method and system which overcomes variations between individual printers of a same make and model.

It is still further an object of the present invention to provide a printer calibration method and system which generates a solution set of correction values for each color channel of a printer in response to a mid-gray point derived as a function of actual versus believed color values for that point.

These and other objects of the invention will be apparent to those skilled in the art from the following detailed description when read in conjunction with the accompanying drawings and the appended claims.

SUMMARY OF THE INVENTION

A system and method for calibrating a printer includes the steps or functions of: transforming predetermined data, representing a color test pattern, into a digital image in a device-dependent color space associated with the printer by use of a test pattern transform, said test pattern transform comprising a portion of the color transform pertaining to the printer coupled with any solution set formed by a previous instantiation of said method, wherein said color test pattern data includes a set of color patches in a device-independent color space with one of said color patches representing a preferred mid-gray hue and other patches representing colors that are close to said preferred mid-gray hue in said device-independent color space; printing said digital image to create a printed color test pattern; providing a reference gray surface; comparing said reference gray surface to said set of colored patches of the printed test pattern to find a closest matching one of said patches, if the closest matching one of said patches is the patch representing the preferred mid-gray hue, then ending the method; otherwise determining, for each color channel of the printer, a solution set of correction values as a function of believed gray versus actual gray, said solution set derived from and including a white point, a black point and a point mapped at $\{G_b, G_a\}$ where $G_b$ is the believed gray value of the closest matching one of said patches and $G_a$ is the actual gray value of the closest matching one of said patches; and adding to the color transform the corresponding solution set for each color channel of the printer.

BRIEF DESCRIPTION OF THE DRAWINGS

The aforementioned aspects and other features of the invention are described in detail in conjunction with the accompanying drawings in which the same reference numerals are used throughout for denoting corresponding elements and wherein.

DETAILED DESCRIPTION OF THE PREFERRED EMBODIMENTS

A method and system are presented for calibrating color printers that results in printed images whose colors have a close visual match, despite variations between the actual printers and the color transforms designed for those printers. The method hinges on the technique of modifying most of the color transformations based on the discovery of a single correction curve parameter for each device color channel. This "single-point" adjustment does not produce a precise match across the entire color gamut of the device, but brings enough colors into line to enhance the perceptual matching of images considerably.

An important criteria used in judging the quality of an image is the degree to which achromatic colors (grays) are reproduced. Images in which gray areas appear tinted or colored are usually judged to be poor quality. In particular, grays that are mid-level (halfway between white and black) are more critical to match than those at the extremes (i.e., full white and full black). Thus, a good choice for a single point mid-gray value (associated with a preferred mid-gray hue as viewed by the user) with which to match for predicting maximum benefit across all gray levels is the mid-gray CIELAB value of $L^*=50$, $a^*=0$, $b^*=0$ for use with media that is neutral white. For media that is slightly colored, the $a^*$ and $b^*$ values of a preferred mid-gray hue color patch should match those of the media itself if the patch is to appear gray. Although the preferred embodiment described herein is directed towards use of a neutral white media, the method extends to non-neutral white media using the above compensation of the $a^*$ and $b^*$ channels for rendering the preferred mid-gray hue.

To summarize the process, the printer digits that the transform believes will produce the preferred mid-gray hue (i.e. believed gray) are discovered and stored, then the digits that actually do produce the preferred mid-gray hue (i.e. actual gray) are discovered and stored, then a solution set of correction values for each color channel is calculated using the stored corresponding pair of digits. More specifically, for each color channel of the printer, a solution set of correction values is determined as a function of believed gray versus actual gray where the solution set is derived from and includes a white point, a black point and a point mapped at $\{G_b, G_a\}$ where $G_b$ is a believed gray value and $G_a$ is an actual gray value for a color patch which exhibits the preferred mid-gray hue. The solution set for each device color channel is added to the color transform path of FIG. 1.

Figure 3:
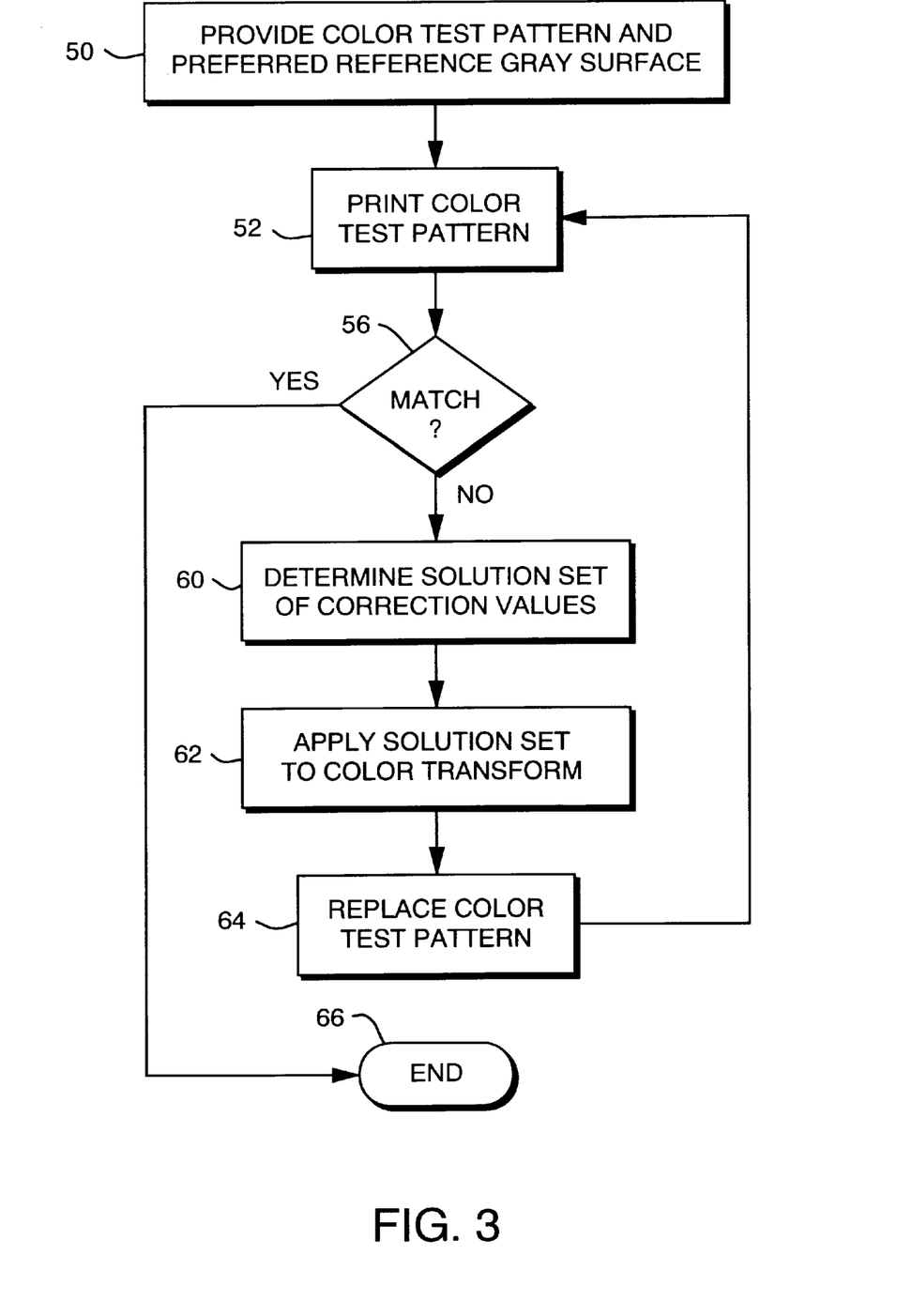
FIG. 3 is a flowchart diagram of a preferred embodiment of the inventive printer calibration method.

The steps for one preferred printer calibration method which operates in accordance with the principles of the present invention is illustrated in FIG. 3. In step 50, a digital representation of the color test pattern and the preferred reference gray surface are provided. The test pattern 80 as represented in FIG. 4(A) is designed to specifically aid in locating the preferred mid-gray hue which in this example is established at $L^*a^*b^*=\{50,0,0\}$.

Figure 8:
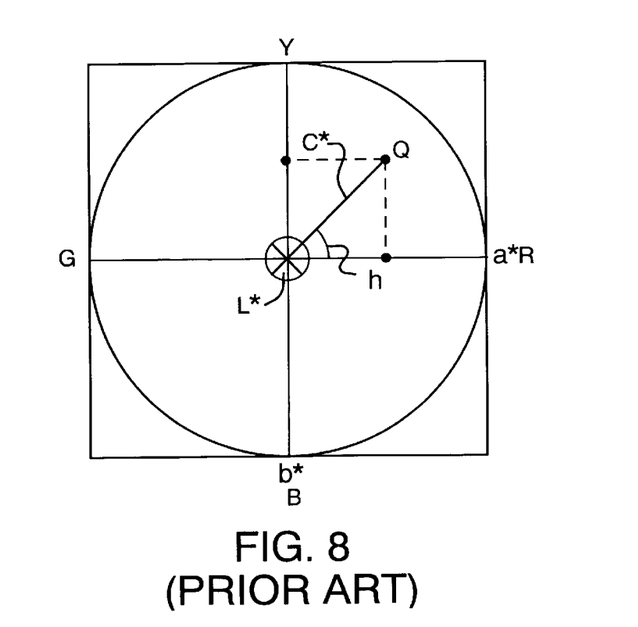
FIG. 8 is a graph which illustrates two different coordinate systems, rectangular and polar, of a device-independent color space.

The colors in the test pattern vary in a device-independent color space such as, but not limited to, CIELAB. They are chosen and arranged to gradually vary away from the preferred mid-gray hue. The colors consist of an even sampling of CIELCh color space, which are converted to CIELAB before being encoded into 8-bit RGB values. CIELAB (or $L^*a^*b^*$) is a rectangular coordinate system of device-independent values which have corresponding $L^*C^*h$ coordinates in a polar CIELCh coordinate system. FIG. 8 illustrates both the CIELAB and CIELCh coordinate systems. The point Q has rectangular coordinates of $\{L^*, a_1, b_1\}$ and corresponding polar coordinates of $\{L^*, C^*, h\}$ where $C^*$ represents a radius, h represents an angle, and $L^*$ represents the scalar of a vector which is perpendicular to both the $a^*$ and $b^*$ axes. Note that the hue of a given point plotted on the polar axis will vary as the hue angle h varies from 0 (red tint), 90 (yellow tint), 180 (green tint) and 270 (blue tint).

Figure 4A:
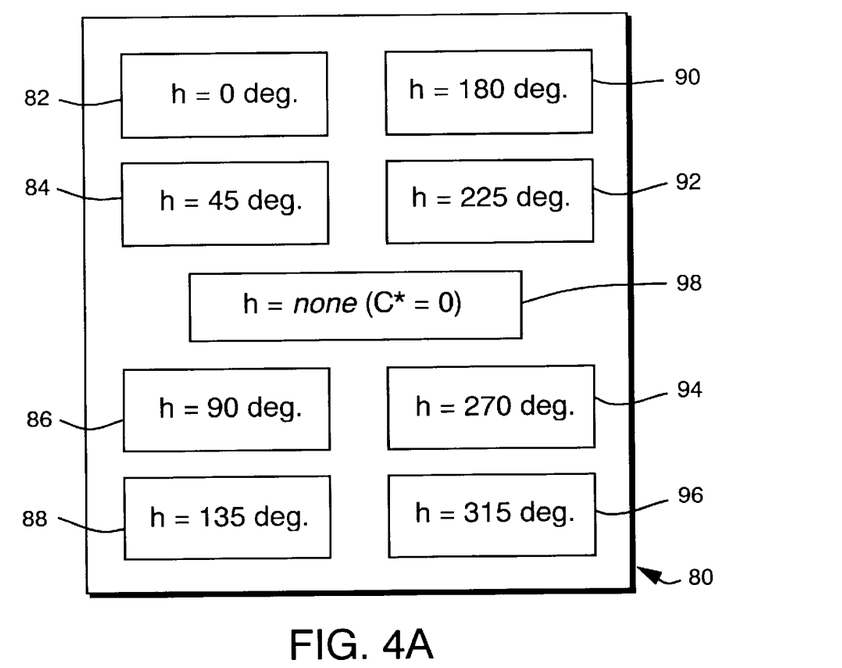
FIG. 4(A) is a representation of one preferred color test pattern for use in accordance with the principles of the invention.
Figure 5:
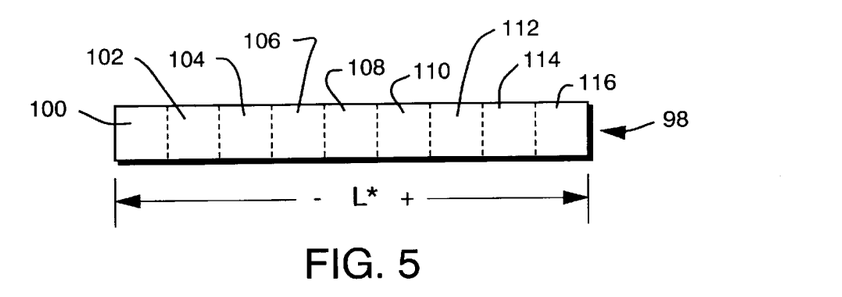
FIG. 5 is a representation of one preferred layout of center section of the color test pattern of FIG. 4.
Figure 6:
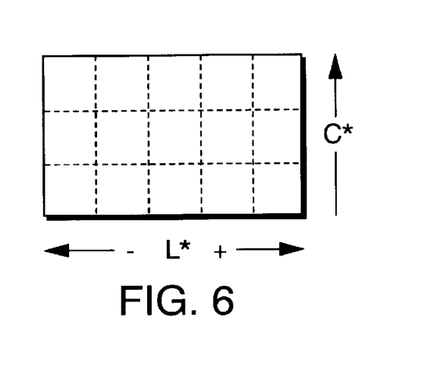
FIG. 6 is a representation of one preferred layout of center section of the color test pattern of FIG. 4.

The colors in the test pattern 80 of FIG. 4(A) are arranged into a number of sections 82, 84, 86, 88, 90, 92, 94, 96 and 98, each associated with a different hue angle h. The center section 98 corresponds to points having a radius $C^*$ of zero, and thus no hue angle. As illustrated in FIG. 5, the center section 98 is designed with nine color patches 100, 102, 104, 106, 108, 110, 112, 114 and 116 where the center patch 108 has a CIELAB value of $\{50,0,0\}$ which associates with the preferred mid-gray hue. Each of the remaining sections 82, 84, 86, 88, 90, 92, 94 and 96 of the test pattern 80 consists of fifteen color patches of varying C* and L* values as illustrated in FIG. 6. The size, shape and number of color patches of the sections 82, 84, 86, 88, 90, 92, 94, 96 and 98 can be varied according to design preference. Also, the number and arrangement of the sections of the color test pattern can be varied as desired. The patches in the various sections of the test pattern 80 preferably vary evenly in L* and/or C* values away from the center value of color patch 108.

In order to print test pattern 80 in step 52, the colors must first be converted to the device-dependent CMYK digits for the printer 24. If the color transform 16 is made up of two profiles, one can convert the colors by running the test pattern's device-independent CIELAB values through the printer profile 44. However, this requires the ability to execute a half-transform made up of one profile only. It is preferable to make use of an existing color management system that implements a transform consisting of a pair of profiles. In this case, the first of the two profiles translates the digits of the test pattern 80 into a device-independent form. The second profile is the printer profile 44 or 46, which completes the transform to CMYK.

If the color transform 16 is not made up of profiles, then the test pattern transform is instead created by using both the knowledge of the encoding of the test pattern 80 and the measurements and additional data about the printer 24 that were used to help create the color transform 16. Information about the source device (in the example, the scanner 12) is not needed to create the test pattern transform.

The predetermined color test pattern 80 is loaded into the computer 6, or into another system component which has processing capabilities, through printer calibration software or hardware. The test pattern 80 originates as a digital image 14 with red, green and blue color channels. These digits are not actual RGB colors, but rather represent an encoding of the visual colors that are desired to come out of the printer being calibrated. The colors are actually resident in device-independent color space, such as CIELAB.

A profile conforming to the earlier described ICC Profile Format Specification is created for use with the test pattern 80. This profile converts 8-bit RGB digits into Profile Connection Space values, using the CIELAB option of the ICC specification. The Red channel (R), Green channel (G) and Blue channel (B) are, respectively, converted to L*, a* and b* values using the following formulae:

$$L^* = 0.0 \quad \text{for } 0 \leq R \leq 4 \quad (1)$$

$$L^* = R/5 + 25.0 \quad \text{for } 5 \leq R \leq 245 \quad (2)$$

$$L^* = 100.0 \quad \text{for } 246 \leq R \leq 255 \quad (3)$$

$$a^* = 0.0 \quad \text{for } 0 \leq G \leq 4 \quad (4)$$

$$a^* = G/5 - 25.0 \quad \text{for } 5 \leq G \leq 245 \quad (5)$$

$$a^* = 0.0 \quad \text{for } 246 \leq G \leq 255 \quad (6)$$

$$b^* = 0.0 \quad \text{for } 0 \leq B \leq 4 \quad (7)$$

$$b^* = G/5 - 25.0 \quad \text{for } 5 \leq B \leq 245 \quad (8)$$

$$b^* = 0.0 \quad \text{for } 246 \leq B \leq 255 \quad (9)$$

This encoding allows a range of CIELAB values around {50,0,0} to be encoded for inclusion onto the test pattern 80. For a test pattern 80 having the above ranges of L*a*b* values, L* can vary from 26.0 to 74.0, and a* and b* values can vary from −24.0 to 24.0.

As described above, the predetermined color test pattern 80 includes the patch having a preferred mid-gray hue of {50,0,0}. As illustrated FIG. 4(B), the same preferred mid-gray hue is provided on a reference gray surface, such as a surface of a reference gray card 2 or any other object as desired. This card 2 is designed to reflect across its gray surface the same percentage of light throughout the visible spectrum so that the perceived color of the gray card 2 is a neutral gray regardless of the spectral composition of the actual light source in use. In a preferred embodiment, a hole 3 is punched through the reference card 2 to facilitate its use.

The next step 52 in the printer calibration method is to print the digital image 14 of the predetermined color test pattern 80 onto the printer 24 which is to be calibrated. This requires first transforming the digital image 14 of the test pattern 80 into the printer image 20 by application of the test pattern transform, and thereafter physically printing the hardcopy 30 on printer 24. Effectively, the existing printer profile 44 is used to complete the transformation into printer-dependent CMYK digits.

Once the test pattern 80 has been rendered as a hardcopy 30, then the various patches of the test pattern 80 must be visually manually compared, according to step 56, by the user with the reference gray card 2. This comparison is made under the same lighting conditions that will be used to judge the desired images. By meeting this requirement, there is an accounting of any differences in the perceived color caused by slight differences in the actual light vs. the predicted light.

After comparing the printed color test pattern 80 with the reference gray card 2, the user determines if the preferred mid-gray hue of patch 108 matches the gray hue of the reference card 2 by sliding the card 2 across the printed test pattern and viewing the various color patches of the test pattern 80 through the viewing hole 3. If the center patch 108 most closely matches the hue of the reference card 2, then the process ends in step 66. If not, then the CMYK values of the color patch on the test pattern 80 which most closely resembles the color of the reference card 2 is selected by the user and stored.

Figure 7:
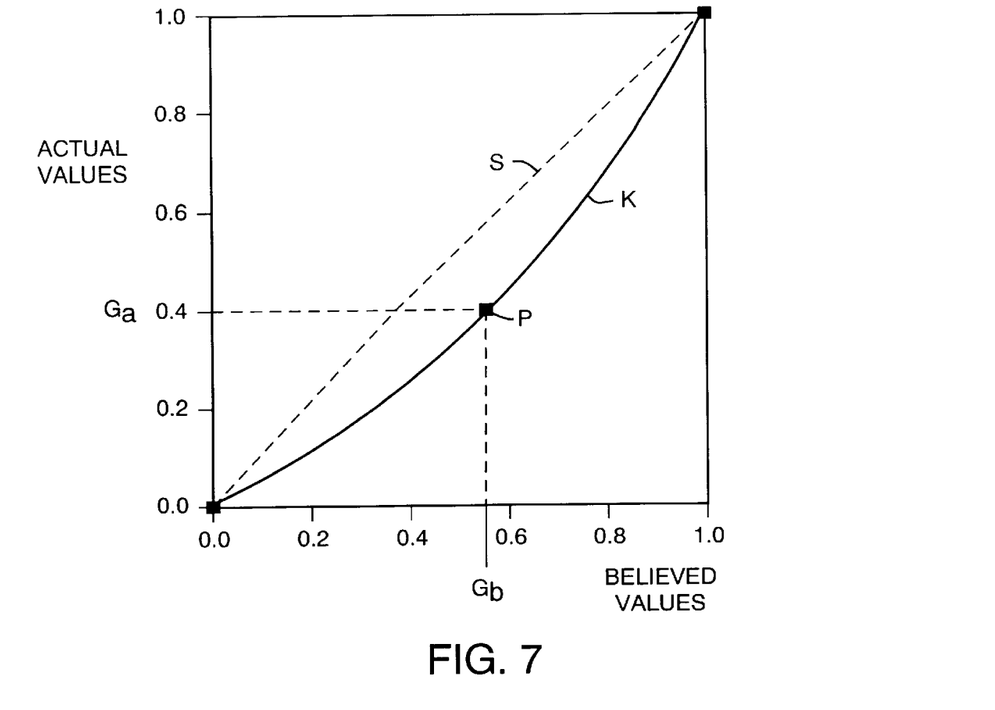
FIG. 7 is a normalized plot of a solution set of correction points represented as a correction curve of believed gray versus actual gray points as estimated in accordance with the principles of the invention.

The process continues in step 60 which provides for generation of a solution set of correction values for proper calibration. The device-dependent CMYK digits used to produce the actual closest matching patch are determined and stored. Turning to FIG. 7, for each CMYK color channel the believed C, M, Y or K value as determined by the original color transform 16 is generated and plotted as the Believed Value versus the Actual Value which corresponds to the C, M, Y and K value of the user-selected closest matching color patch of the test pattern 80. The calibration of Believed versus Actual Values for the, in this case, four device color channels will yield the point P which is used along with the normalized white (1.0,1.0) and black (0.0, 0.0) points to yield a solution set or correction curve K of estimated correction values δ (Believed Value, Actual Value) derived, for instance, by taking the difference at any given point between straight line S and the correction curve K.

Specifically, for each color channel the printer 24 uses, the printer digit that is believed to produce the preferred mid-gray hue of the reference gray card 2 is paired with the printer digit that was found to actually produce the preferred mid-gray hue of the reference gray card 2. These paired digits are then scaled by dividing by the maximum device digit value to produce normalized values between 0.0 and 1.0. A smooth curve is then generated that passes through the points (0.0, 0.0), (normalized believed gray, normalized actual gray), and (1.0, 1.0) as illustrated in FIG. 7. The curve, which is based on the difference between the normalized believed gray value and the normalized actual gray value, can be generated from known curve generation functions. The resolution of the curve is potentially infinite and the correction values δ(Believed Value, Actual Value) can be derived directly from a mathematical function which depicts the curve K, or they can be stored in a lookup table.

There are many ways to compute the correction curve, including using a power function and computing a smooth spline. Another way to create the curve, as described above, is to use the difference between the normalized actual gray and the normalized believed gray as the maximum offset from an identity curve (y=x). Offsets vary smoothly from zero to the maximum value and back to zero. One way to vary the offsets is to use a pair of quadratic functions. The resulting curve is defined as:

$$y = x + ((actual - believed) * F(x)) \quad (10)$$

$$F(x) = 1 - ((believed - x)/believed)^2 \quad \text{for } x \leq believed \quad (11)$$

$$F(x) = 1 - ((x - believed)/(1 - believed))^2 \quad \text{for } x > believed \quad (12)$$

When complete, the number of correction curves computed equals the number of color channels of the printer being calibrated.

The correction curves are then introduced into the transform chain according to step 62. This can be accomplished in three ways.

1. The curves can be used to adjust the printer profile 44 or other transform directly. The resulting profile or transform is then considered to be customized for the printer 24 being calibrated, and should not be used for any other printer.

2. The curves can be distilled into lookup tables (not shown) that translate the original device-dependent printer digits into different device-dependent printer digits. These lookup tables can then be used to modify each pixel of the printer image 22 (that which is produced with the normal color transform 18) as it is moved from memory to the printer 26. This introduces a second transform into the transform path.

3. The curves can be distilled into lookup tables that transform device-dependent printer digits into different device-dependent printer digits. These lookup tables can then be downloaded to the printer 26 to effectively change the behavior of the printer 26. Thus, the printer 26 now behaves closer to the way its color transform 18 expects it to behave.

Once the correction curves are placed in the transform path, the test pattern can be transformed and printed once again to test the results of the calibration. If the correction was ideal, then the center gray patch of the printed test pattern 30 should visually match the reference gray card 2. This will not always be the case, due to the fact that the printed test pattern 30 does not contain every possible color near the preferred mid-gray hue. In this case, the closest match might not be close enough. The match will also be incorrect if the operator chooses a patch that is not the closest match.

Since the new test pattern's center gray patch does not match the reference gray card 2, then the above procedure is run again, i.e the process of FIG. 3 loops from step 64 to step 52. The operator again chooses the closest match from the new test pattern. Since the correction curves effectively change the printer's behavior, the colors in the new test pattern will be different from the ones in the original test pattern. This increases the possibility that a matching gray will appear on the test pattern, since each iteration of the method brings the center patch closer to the preferred mid-gray hue.

Figure 4B:
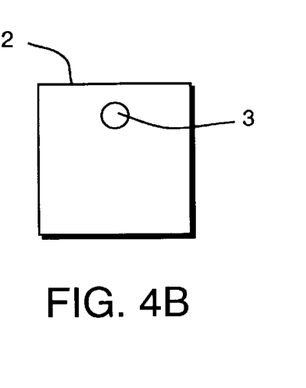
FIG. 4(B) is a representation of one preferred reference gray card.

In effect, the original predetermined color test pattern will appear as a modified test pattern with the previously selected color patch which most closely resembles the hue of the reference gray card 2 of FIG. 4(B) now being positioned at patch 108 in the test pattern of FIGS. 4(A) and 5. Again, the surrounding patches are distributed as an even sampling of colors surrounding the color of the center patch.

The above steps are repeated to calculate a new solution set or correction curves. The new solution set or correction curves must then be concatenated with the previous solution set or correction curves in order to result in a single solution set or set of curves, respectively. However, this operation can be the source of error. If the correction values have been stored in lookup tables, these tables contain some small quantization error caused by rounding to the nearest device digit. Concatenation of multiple lookup tables can cause the quantization error to accumulate to a noticeable degree.

This problem can be eliminated by retaining the original transform 16 or profile 44 used for the printer 24. This original transform 16 or profile 44 is always used to determine the device-dependent printer digits that are believed to produce the CIELAB color {50,0,0}. The solution set or correction curves that come from the pairing of the new actual-gray digits and the original believed-gray digits completely replace the solution set or correction curves used previously. Note that if the previous solution set or correction curves were used to adjust the transform 16 or the profile 44, then they are replaced by a new transform or profile by adjusting the original transform or profile using the new solution set of correction values. By using this method, the quantization error is limited to that caused by quantizing the solution set a single time.

It is to be understood that the above described embodiments are merely illustrative of the present invention and represent a limited number of the possible specific embodiments that can provide applications of the principles of the invention. Further, commonly known descriptors for the color spaces, input and output devices, transforms and profiles used in the preferred embodiments are exemplary and are readily expandable to equivalents as understood by those skilled in the art. Numerous and varied other arrangements may be readily devised in accordance with these principles by those skilled in the art without departing from the spirit and scope of the invention as claimed.

We claim:

1. A method for improving a color transform for a printer comprising the steps of:

transforming predetermined data, representing a color test pattern, into a digital image in a device-dependent color space associated with the printer by use of a test pattern transform, said test pattern transform comprising a portion of the color transform pertaining to the printer coupled with any solution set formed by a previous instantiation of said method, wherein said color test pattern data includes a set of color patches in a device-independent color space with one of said color patches representing a preferred mid-gray hue and other patches representing colors that are close to said preferred mid-gray hue in said device-independent color space;

printing said digital image to create a printed color test pattern;

providing a reference gray surface having a spectral reflectance characteristic that is flat or nearly flat and a gray level that is the same as said preferred mid-gray hue;

comparing said reference gray surface to said set of colored patches of the printed test pattern to find a closest matching one of said patches, if the closest matching one of said patches is the patch representing the preferred mid-gray hue, then ending the method; otherwise storing a data set of values indicative of the closest matching one of said colored patches;

determining, for each color channel of the printer, a solution set of correction values as a function of believed values versus actual values, said solution set derived from and including a point $\{0,0\}$, a point $\{1.0,1.0\}$, whereby the maximum printer device value is normalized to 1.0, and a point mapped at $\{G_b, G_a\}$ where $G_b$ is the believed value of the closest matching one of said patches and $G_a$ is the actual value of the closest matching one of said patches;

adding to the color transform the corresponding solution set for each color channel of the printer; and repeating this method using the color transform having the corresponding solution set added thereto.

2. The method of claim 1 wherein, in CIELAB values, said reference gray surface measures $\{50,0,0\}$.

3. The method of claim 1 wherein the color transform is facilitated by use of a pair of profiles and said portion of the color transform pertaining to the printer is given by the printer profile.

4. A system for improving a color transform for a printer comprising:

means for transforming predetermined data, representing a color test pattern, into a digital image in a device-dependent color space associated with the printer by use of a test pattern transform, said test pattern transform comprising a portion of the color transform pertaining to the printer coupled with any solution set formed by a previous instantiation of said method, wherein said color test pattern data includes a set of color patches in a device-independent color space with one of said color patches representing a preferred mid-gray hue and other patches representing colors that are close to said preferred mid-say hue in said device-independent color space;

means for printing said digital image to create a printed color test pattern:

means for comparing a reference gray surface, having a spectral reflectance characteristic that is flat or nearly flat and a gray level that is the same as said preferred mid-gray hue, to said set of colored patches of the test pattern rendered by the printer to find a closest matching one of said patches, ceasing operation if the closest matching one of said patches is the patch representing the preferred mid-gray hue;

means for storing a data set of values indicative of the closest matching one of said colored patches;

means for determining, for each color channel of the printer, a solution set of correction values as a function of believed values versus actual values, said solution set derived from and including a point $\{0,0\}$, a point $\{1.0, 1.0\}$, whereby the maximum printer device value is normalized to 1.0, and a point mapped at $\{G_b, G_a\}$ where $G_b$ is the believed value of the closest matching one of said patches and $G_a$ is the actual value of the closest matching one of said patches;

means for adding to the color transform the corresponding solution set for each color channel of the printer; and means for restarting the system using the color transform having the corresponding solution set added thereto.

5. The system of claim 4 wherein, in CIELAB values, said reference gray surface measures $\{50,0,0\}$.

6. The system of claim 4 wherein the color transform is facilitated by use of a pair of profiles and said portion of the color transform pertaining to the printer is given by the printer profile.

7. The method of claim 1 wherein the process of adding the corresponding solution set to the color transform for each color channel of the printer is accomplished by concatenating the solution set with the color transform.

8. The method of claim 1 wherein the process of adding the corresponding solution set to color transform for each color channel of the printer is accomplished by creating lookup tables from the solution set and modifying the output of the color transform using said lookup tables.

9. The method of claim 1 wherein the process of adding the corresponding solution set to the color transform for each color channel of the printer is accomplished by creating lookup tables from the solution set and downloading said lookup tables to the printer.

10. The system of claim 4 wherein the means for adding the corresponding solution set to the color transform for each color channel of the printer is accomplished by concatenating the solution set with the color transform.

11. The system of claim 4 wherein the means for adding the corresponding solution set to color transform for each color channel of the printer is accomplished by creating lookup tables from the solution set and modifying the output of the color transform using said lookup tables.

12. The system of claim 4 wherein the means for adding the corresponding solution set to the color transform for each color channel of the printer is accomplished by creating lookup tables from the solution set and downloading said lookup tables to the printer.

\* \* \* \* \*